United States Patent [19]

Staubs

[11] Patent Number: 5,763,039
[45] Date of Patent: Jun. 9, 1998

[54] PROTECTIVE CARPET SYSTEM

[76] Inventor: William E. Staubs, 1816 N. Dixie Hwy., Fort Lauderdale, Fla. 33305

[21] Appl. No.: 664,523

[22] Filed: Jun. 17, 1996

[51] Int. Cl.$^6$ .................................................. B32B 3/02
[52] U.S. Cl. .................... 428/95; 428/86; 428/171; 15/215; 15/216; 15/217; 296/97.23
[58] Field of Search ....................... 428/86, 95, 171; 15/215, 216, 217; 296/97.23

[56] References Cited

U.S. PATENT DOCUMENTS

| | | | |
|---|---|---|---|
| 2,709,105 | 5/1955 | Kramer | 296/97.23 |
| 2,763,587 | 9/1956 | Masland, Jr. | 428/95 |
| 2,810,671 | 10/1957 | Taylor | 15/215 |
| 3,562,086 | 2/1971 | Kantor | 428/95 |
| 4,528,229 | 7/1985 | Gottlieb | 428/95 |
| 4,731,275 | 3/1988 | Andersen | 428/95 |
| 4,748,063 | 5/1988 | Reuben | 428/95 |
| 4,946,719 | 8/1990 | Dempsey | 428/95 |
| 5,573,294 | 11/1996 | Mack | 296/97.23 |

*Primary Examiner*—Terrel Morris
*Attorney, Agent, or Firm*—Robert M. Downey, P.A.

[57] ABSTRACT

An elevated carpet system and method of applying the carpet system to a surface to protect the underlying surface from damaging exposure to water, salt and moisture. The carpet system includes a waterproofing membrane layer applied to the underlying surface and a weather-resistant carpet having a nibbed vinyl backing defined by an array of spaced nipple projections. The projections support the carpet in spaced relation above the waterproofing membrane layer so that an air gap is maintained therebetween to promote ventilation and drying of moisture which seeps through the carpet.

6 Claims, 1 Drawing Sheet

1

PROTECTIVE CARPET SYSTEM

BACKGROUND OF THE INVENTION

1. Field of the Invention

The present invention is directed to a protective carpet system and method for applying carpet to concrete surfaces, such as on balconies and patios, to protect the underlying surface from being damaged from exposure to water, salt, moisture and other corrosion inducing substances.

2. Description of the Related Art

In order to provide a more comfortable, aesthetically pleasing floor surface, indoor/outdoor carpeting is often applied to the concrete surface of balconies, patios and the like. Typically, this is done by gluing the bottom surface (backing) of the carpet directly to the deck surface using commercially available adhesives. While this generally provides for a more appealing and comfortable floor surface, it has been discovered that conventional indoor/outdoor carpeting, and conventional installation methods, do not adequately protect the underlying concrete and steel reinforcing structure of the balcony or deck. Over time, water, salt and moisture penetrate through the carpeting and seep through the porous concrete, causing the steel reinforcing structure within the concrete to corrode. As the steel corrodes, it expands, causing the concrete to spall. Over time, this continuous corrosive activity undermines the structural integrity of the underlying concrete surface, resulting in an unsafe condition.

In the past, carpet installation systems have been proposed in an attempt to solve the problems resulting from direct contact of the carpet with concrete surfaces. Specifically, methods involving waterproofing of the cement slabs and applying carpets directly in contact with the waterproofing membrane have been tried in the past. However, it has been subsequently found that this installation method eventually leads to membrane failure. This allows water and salt which drain through the carpet to come into contact with the concrete surface below. Other concrete surface covering methods allow sand to fill up essential drainage ports and also create an ideal breeding hatchery for fleas, ants, roaches, and bees. These types of carpet covering and installation methods actually change the railing height requirements and, in turn, make the balcony unsafe and illegal under various nationwide life safety codes.

OBJECTS AND ADVANTAGES OF THE INVENTION

With the foregoing in mind, it is a primary object of the present invention to provide a carpet system and method of application which is structured and disposed to protect the underlying surface and structure from the damaging effects of water, moisture and salt exposure.

It is a further object of the present invention to provide a carpet system and method of installation of the carpet system which is highly attractive and which protects the underlying surface from exposure to water, moisture and salt.

It is still a further object of the present invention to provide a protective carpet system and a method of installing the system on concrete surfaces to prevent corrosion of steel reinforcing structure and spalling of the concrete surface.

It is yet a further object of the present invention to provide a protective carpet system and method of installing the carpet system on concrete surfaces, such as outdoor decks and balconies, wherein the carpet system is structured to protect the underlying concrete surface from damaging exposure to water, salt and moisture and which is further structured to maintain the carpet elevated, in spaced relation above the underlying surface, forming an air gap therebetween, to promote drying and ventilation.

It is still another object of the present invention to provide a protective carpet system and method of installation, as set forth above, which is cost effective and relatively simple to install on decks, patios, balconies and like outdoor surfaces to protect such surfaces from the damaging effects of water, moisture and salt exposure.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
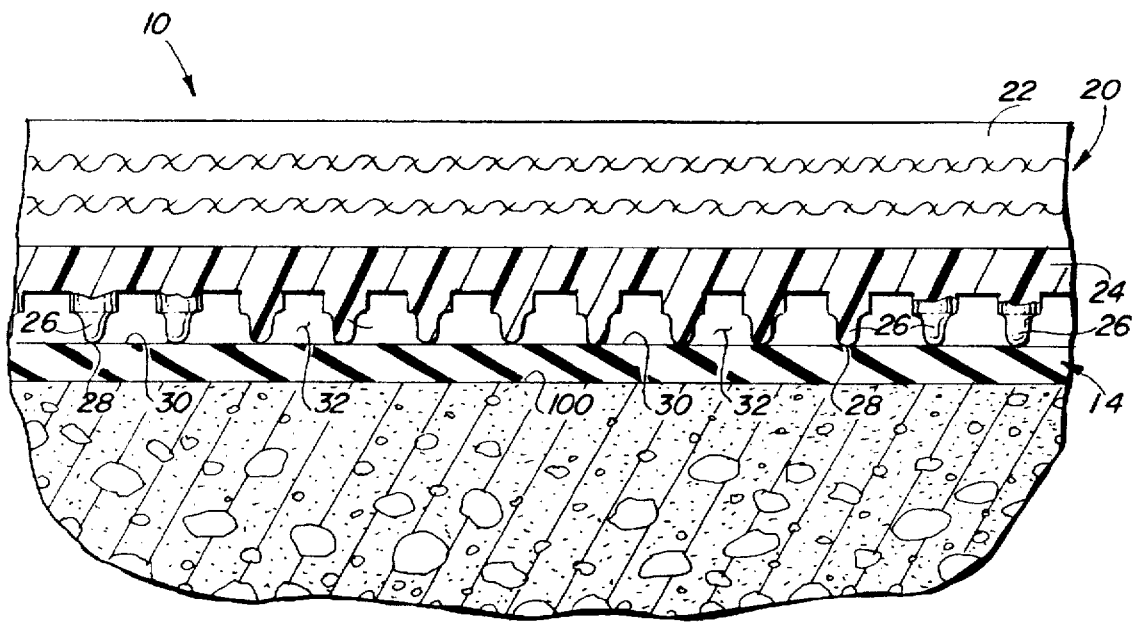
FIG. 1 is a sectional view illustrating the structural components of the elevated carpet system applied to a concrete deck surface.
Figure 2:
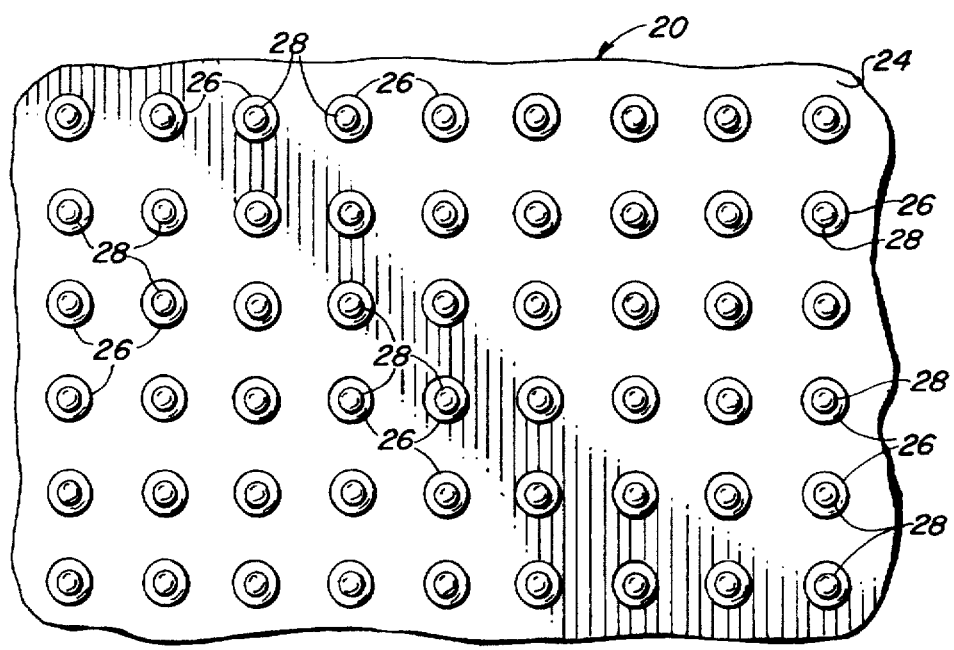
FIG. 2 is an isolated plan view of the nibbed backing of the carpet in accordance with the present invention, showing the array of nipple projections extending from the bottom vinyl layer of the carpet.

The present invention is directed to a protective carpet system, and method of installing the carpet system on an underlying surface. The carpet system, generally indicated as 10 in FIG. 1, is structured to protect the underlying surface 100 from damaging exposure to water, salt, and moisture and other corrosive elements.

The carpet system 10 includes a liquid impervious membrane layer 14 applied to the underlying surface 100. In the preferred embodiment, the liquid impervious membrane layer 14 consists of a single component, bitumen-modified, moisture-curing polyurethane waterproofing membrane such as Tremproof™ 60, manufactured by Tremco, a B.F. Goodrich Specialty Chemicals Company. The liquid impervious waterproofing membrane 14 is intended for use as an inter-layer membrane for shielding the underlying surface 100 from exposure to water, salt, moisture and other corrosive elements.

The system 10 further includes an elevated carpet 20 having a high ultraviolet, stabilized fiber layer 22 structured and disposed to withstand prolonged exposure to the outdoor elements including direct sunlight, rain, snow, ice, salt and dirt. The elevated carpet 20 further includes a bottom layer 24, or backing, formed of a vinyl based polymer. A plurality of vinyl nipple projections 26 integrally formed in a uniform spaced array on the bottom layer 24 extend downwardly therefrom and terminate at distal ends 28.

The elevated carpet 20 is applied to the waterproofing membrane layer 14 so that the distal ends 28 of the projections 26 engage a top surface 30 of the waterproofing membrane layer 14. As seen in FIG. 1, the elevated carpet 20 is maintained in spaced relation above the top surface 30 to form an air gap 32 therebetween. This prevents direct contact of the carpet 20 with the waterproofing membrane layer 14, thereby promoting ventilation and drying of trapped moisture which seeps through the carpet 20.

The method of installing the carpet system, in accordance with the present invention, involves first removing any existing floor covering materials, such as carpeting, tiles, etc. from the underlying floor surface, thereby exposing the underlying surface.

The present invention is particularly useful to protect concrete surfaces, such as outdoor patios and balconies. In this instance, it may be necessary to make repairs to the exposed concrete surface prior to installing the carpet system 10 thereon. This generally involves repairing of deck spalling, cracks and areas exhibiting concrete delamination. These repairs are made using epoxy injection and other repair procedures and/or methods commonly known to those skilled in the industry.

After making the necessary repairs to store the structural integrity of the underlying surface 100, a migrating corrosion inhibitor is applied to the concrete surface 100. Thereafter, a masonry conditioner, comprising a clear, penetrating silane dissolved in organic solvent, is applied to the surface 100 using a roller or airless sprayer at a rate of 250–300 square feet per gallon. The conditioner is specifically formulated to act as an adhesion promotor and should be allowed to dry overnight. An example of a masonry conditioner useful in accordance with the method of the present invention is Tremproof, a product of Tremco, a B. F. Goodrich Specialty Chemicals Company.

Next, the liquid impervious waterproofing membrane is applied to the surface 100 and spread to form layer 14 of a uniform, predetermined thickness. In the preferred embodiment, the waterproofing membrane is applied in a liquid form and applied by roller, trowel, squeegee or spray, directly to the surface 100, to achieve a preferred thickness having a flat, planer top surface 30 of not less than 60 west mils or a 1/16 inch (1.5 mm).

Once the waterproofing membrane layer 14 cures over a period of at least 36 hours, the carpet 20 is laid down on the top surface 30 of the layer 14. After cutting the carpet to fit to edges of the deck or balcony and around structures such as posts, lips, curbs, etc., the carpet 20 is pressed flat so that the distal ends 28 of the projections 26 engage the top surface 30 of the waterproofing membrane layer 30. The distal ends 28 grip the top surface, holding the carpet 20 in place. The carpet 20 can be loosely installed with adhesive, attaching only the corners and a few critical points. This allows the carpet to be lifted for future inspections.

While the present invention has been shown and described in what is considered to be a preferred and practical embodiment thereof, it is recognized that departures may be made within the spirit and scope of the present invention which, therefore, should not be limited except as set forth in the following claims and within the doctrine of equivalents.

Now that the invention has been described,

What is claimed is:

1. A protective carpet system for application to an underlying surface comprising:

a moisture-curing polyurethane material applied in a liquid form in covering relation to the underlying surface and spread to form a liquid impervious membrane layer of predetermined uniform thickness, said membrane layer including a flat, planar top surface;

a carpet including:
     a top fiber layer;
     a bottom layer formed of a vinyl based polymer defining a backing; and
     a plurality of nipple projections formed in a spaced array on said bottom layer and extending downwardly therefrom and each terminating at a distal tip and;

said distal tips of said array of nipple projections engaging said top surface of said liquid impervious membrane layer to support said carpet in spaced relation above said top surface and forming an air gap therebetween.

2. A protective carpet system as recited in claim 1 wherein said liquid impervious membrane layer is formed of a single component, bitumen-modified, moisture-curing polyurethane waterproofing membrane material.

3. A protective carpet system as recited in claim 1 wherein said predetermined uniform thickness of said liquid impervious membrane layer is at least 1/16 of an inch.

4. A protective carpet system as recited in claim 3 wherein said top layer and said bottom layer of said carpet are bound together to form an integral unit.

5. A protective carpet system as recited in claim 4 wherein said plurality of nipple projections are integrally formed with said bottom layer of said carpet.

6. A protective carpet system as recited in claim 5 wherein said bottom layer and said plurality of nipple projections are formed of a vinyl based polymer.

\* \* \* \* \*